United States Patent
Yamada et al.

(10) Patent No.: US 11,391,593 B2
(45) Date of Patent: Jul. 19, 2022

(54) VEHICLE-MOUNTED DEVICE, SERVER, NAVIGATION SYSTEM, RECORDING MEDIUM STORING MAP DISPLAY PROGRAM, AND MAP DISPLAY METHOD

(71) Applicant: Toyota Jidosha Kabushiki Kaisha, Toyota (JP)

(72) Inventors: Yoshinori Yamada, Nagakute (JP); Takahiro Suzuki, Nagoya (JP); Yosuke Tokuda, Ota-ku Tokyo-to (JP); Taiki Nakamura, Toyota (JP); Miyu Tanaka, Miyoshi (JP); Kentaro Otokubo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 16/206,138

(22) Filed: Nov. 30, 2018

(65) Prior Publication Data
US 2019/0219416 A1    Jul. 18, 2019

(30) Foreign Application Priority Data

Jan. 17, 2018   (JP) .............................. JP2018-005506

(51) Int. Cl.
*G08G 1/017* (2006.01)
*G08G 1/123* (2006.01)
(Continued)

(52) U.S. Cl.
CPC ........ *G01C 21/3667* (2013.01); *G01S 5/0009* (2013.01); *G07C 5/008* (2013.01);
(Continued)

(58) Field of Classification Search
CPC ..... G06Q 10/1093–1097; G06Q 50/01; G06Q 50/30; G06G 1/0112; G06G 1/0141;
(Continued)

(56) References Cited

U.S. PATENT DOCUMENTS

| 2003/0069689 | A1* | 4/2003 | Ihara | ...................... | G09B 29/106 |
| | | | | | 701/455 |
| 2004/0148090 | A1* | 7/2004 | Melen | ...................... | G01C 21/26 |
| | | | | | 701/482 |

(Continued)

FOREIGN PATENT DOCUMENTS

| JP | 2003141682 A | * | 5/2003 |
| JP | 2005258932 A | * | 9/2005 |

(Continued)

OTHER PUBLICATIONS

Omura—English Description and Claims of JP-2003141682-A, via Espacenet Patent Translate, retrieved Jun. 8, 2020 (Year: 2020).*

(Continued)

*Primary Examiner* — Jeffrey C Boomer
*Assistant Examiner* — Paul Allen
(74) *Attorney, Agent, or Firm* — Dinsmore & Shohl LLP

(57) ABSTRACT

A vehicle-mounted device that includes: a memory; and a processor, wherein the processor is configured to: detect an own vehicle position; transmit position information that indicates the detected own vehicle position to a location outside the own vehicle, together with car model information that indicates a car model of the own vehicle; receive position information of another vehicle of a predetermined specific car model or map information that indicates a position of the other vehicle, from the location outside the own vehicle; and display the position of the other vehicle on a monitor as a map, based on a reception result.

6 Claims, 8 Drawing Sheets

(51) Int. Cl.
*G07C 5/00* (2006.01)
*G08G 1/0969* (2006.01)
*G08G 1/0967* (2006.01)
*G08G 1/01* (2006.01)
*G08G 1/015* (2006.01)
*G01C 21/36* (2006.01)
*G01S 5/00* (2006.01)

(52) U.S. Cl.
CPC ............ *G08G 1/015* (2013.01); *G08G 1/017* (2013.01); *G08G 1/0112* (2013.01); *G08G 1/0141* (2013.01); *G08G 1/0969* (2013.01); *G08G 1/09675* (2013.01); *G08G 1/096716* (2013.01); *G08G 1/096741* (2013.01); *G08G 1/096775* (2013.01); *G08G 1/096791* (2013.01); *G08G 1/123* (2013.01)

(58) Field of Classification Search
CPC .. G06G 1/015; G06G 1/017; G06G 1/096716; G06G 1/096741; G06G 1/09675; G06G 1/096775; G06G 1/096791; G06G 1/0969; G06G 1/123
USPC .................................................. 701/400–541
See application file for complete search history.

(56) References Cited

U.S. PATENT DOCUMENTS

| | | | | |
|---|---|---|---|---|
| 2004/0158401 | A1* | 8/2004 | Yoon | G01C 21/3667 701/410 |
| 2010/0145764 | A1* | 6/2010 | de Silva | G01C 21/3476 705/7.25 |
| 2011/0015820 | A1* | 1/2011 | Asahara | G08G 1/205 701/31.4 |
| 2013/0137476 | A1* | 5/2013 | Kawaguchi | H04W 4/029 455/519 |
| 2014/0107866 | A1* | 4/2014 | Hamaue | G08C 17/00 701/2 |
| 2014/0214933 | A1* | 7/2014 | Liu | H04L 67/12 709/204 |
| 2015/0045988 | A1* | 2/2015 | Gusikhin | G07C 9/00571 701/2 |
| 2015/0154872 | A1* | 6/2015 | Schafer | G08G 1/096716 701/1 |
| 2015/0345970 | A1* | 12/2015 | Tanaka | G01C 21/3617 701/521 |
| 2017/0083345 | A1* | 3/2017 | Sol | H04W 12/08 |
| 2017/0193491 | A1* | 7/2017 | Phipps | G06Q 20/326 |
| 2017/0358208 | A1* | 12/2017 | Kazemi | H04W 4/44 |
| 2018/0227704 | A1* | 8/2018 | Itoh | G08G 1/096827 |
| 2018/0232647 | A1* | 8/2018 | Appleby | G06N 3/006 |
| 2019/0164135 | A1* | 5/2019 | Bellary | G06F 40/30 |
| 2020/0082727 | A1* | 3/2020 | Zhao | G08G 1/096791 |
| 2020/0225050 | A1* | 7/2020 | Hirose | G01C 21/3605 |

FOREIGN PATENT DOCUMENTS

| | | |
|---|---|---|
| JP | 2009031888 A | 2/2009 |
| JP | 2013-134228 A | 7/2013 |
| JP | 2014153347 A | 8/2014 |

OTHER PUBLICATIONS

Suzuki, Hideyuki—English Description of JP-2005258932-A via Espacenet patent translate, Apr. 9, 2021 (Year: 2021).*
https://dekiru.net/article/15206—Google Maps—Apr. 2, 2017.

* cited by examiner

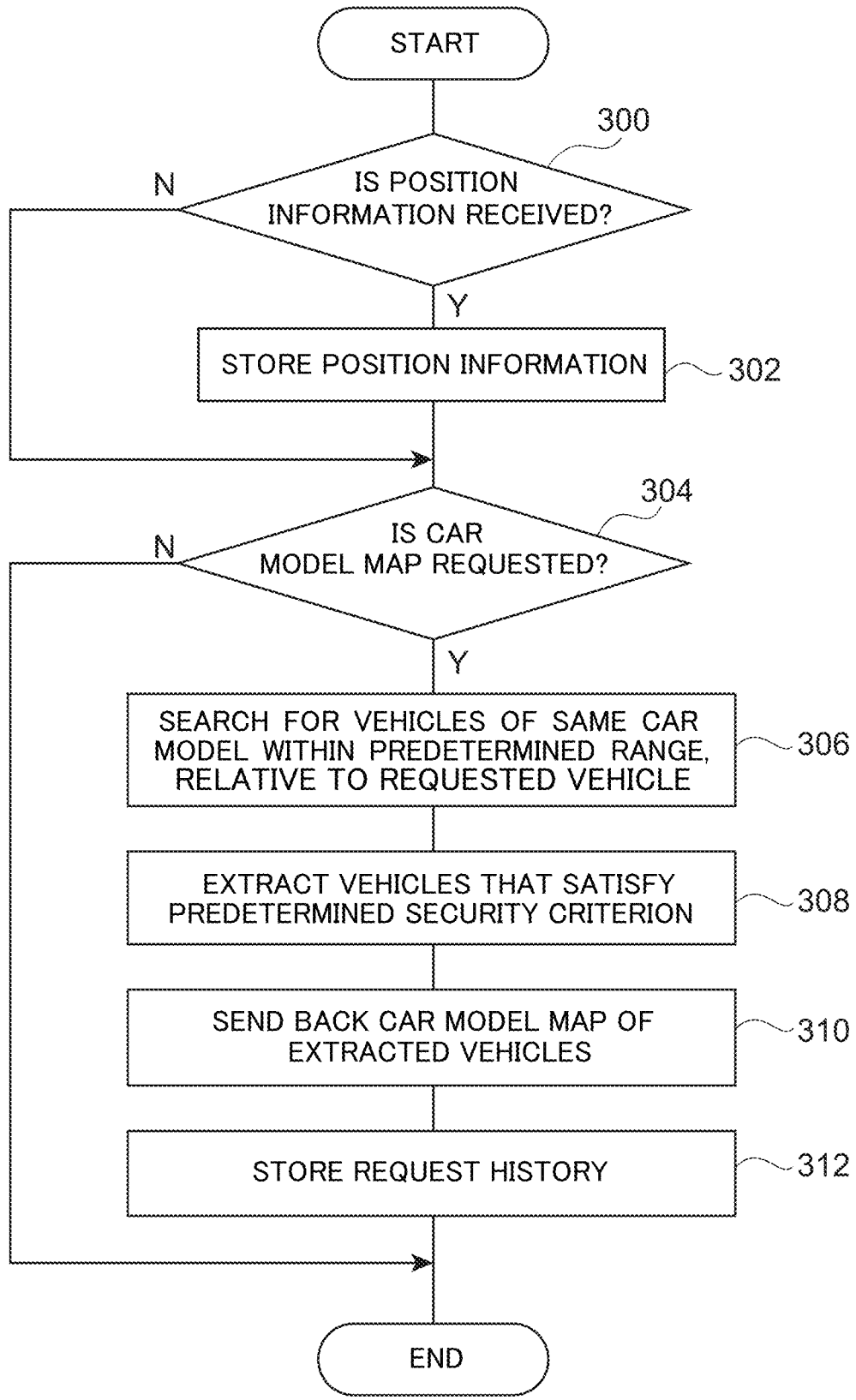

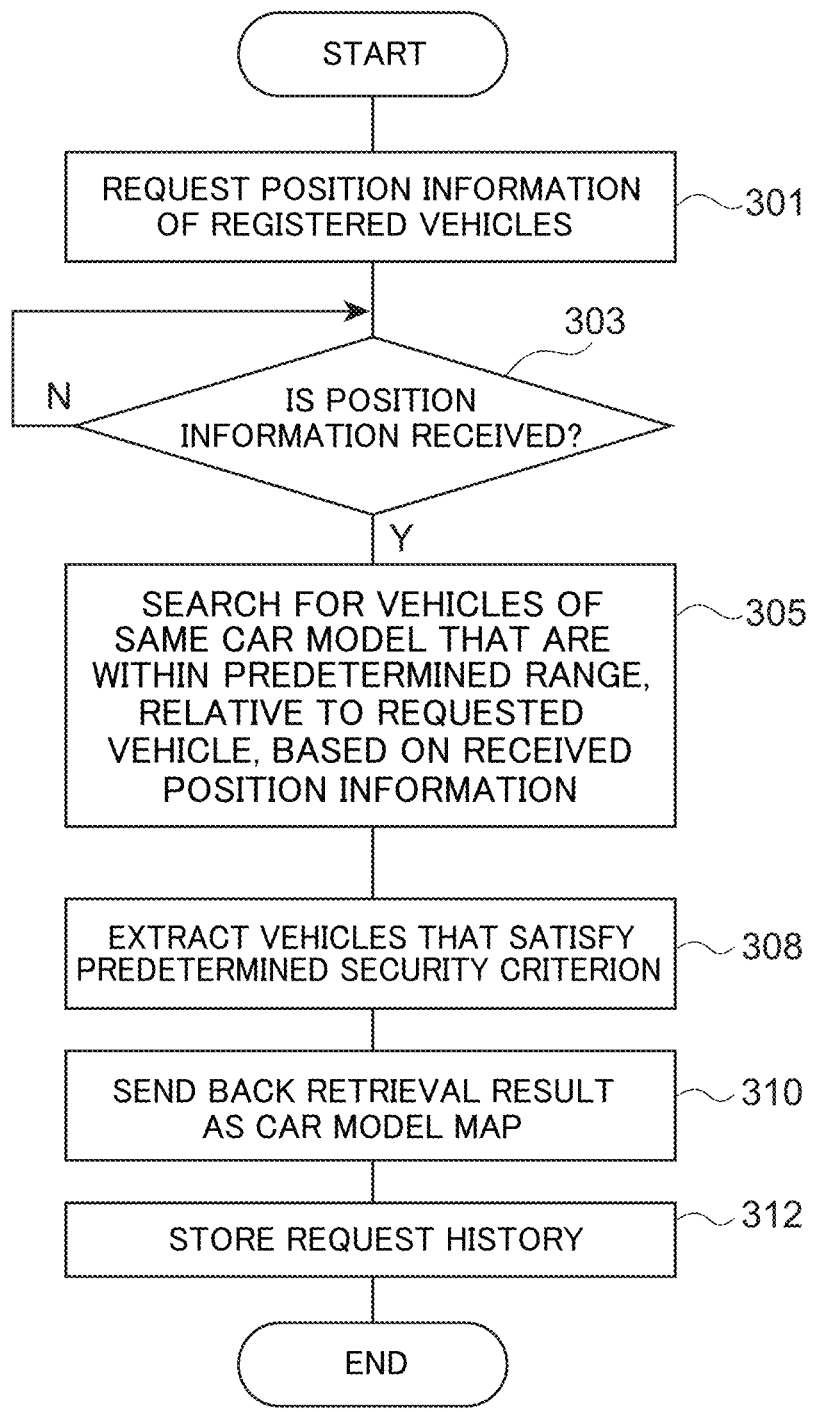

VEHICLE-MOUNTED DEVICE, SERVER, NAVIGATION SYSTEM, RECORDING MEDIUM STORING MAP DISPLAY PROGRAM, AND MAP DISPLAY METHOD

CROSS-REFERENCE TO RELATED APPLICATION

This application is based on and claims priority under 35 USC 119 from Japanese Patent Application No. 2018-005506 filed on Jan. 17, 2018, which is incorporated by reference herein.

BACKGROUND

Technical Field

The present disclosure relates to a vehicle-mounted device that guides a user to a destination, a server, a navigation system, a recording medium storing a map display program, and a map display method.

Related Art

Japanese Patent Application Laid-Open No. 2013-134228 proposes a navigation system that includes a moving image management unit that manages moving image information having correspondences between moving image data captured at predetermined locations, the shooting locations of the moving image data, and users who have shot the moving image data; a relationship management unit that manages relationship information having relationships between users; and a route candidate generation unit, when the user requests a search for a route from a start point to a destination, that retrieves the other user who has close relationship with the requestor user based on the relationship information, that identifies the moving image data shot by the other user based on the moving image information, and that generates a route candidate that can arrive from the start point at the destination via the shooting location of the moving image data.

However, according to the technique of Japanese Patent Application Laid-Open No. 2013-134228, to generate the route candidate that is routed via the shooting location of the moving image data shot by the other user, the requestor user has to become friends with the other user in advance, and therefore the navigation system is susceptible to improvement to encourage interaction among complete strangers.

SUMMARY

An aspect of the present disclosure is a vehicle-mounted device that includes: a memory; and a processor, wherein the processor is configured to: detect an own vehicle position; transmit position information that indicates the detected own vehicle position to a location outside the own vehicle, together with car model information that indicates a car model of the own vehicle; receive position information of another vehicle of a predetermined specific car model or map information that indicates a position of the other vehicle, from the location outside the own vehicle; and display the position of the other vehicle on a monitor as a map, based on a reception result.

BRIEF DESCRIPTION OF THE DRAWINGS

FIG. 7 is a flowchart showing an example of a specific process flow performed by the server after the registration for use of car model maps; and FIG. 8 is a flowchart showing an example of a process flow performed by the server, when the server collects position information of vehicles from vehicle-mounted devices by pull delivery.

DESCRIPTION OF EMBODIMENTS

Figure 1:
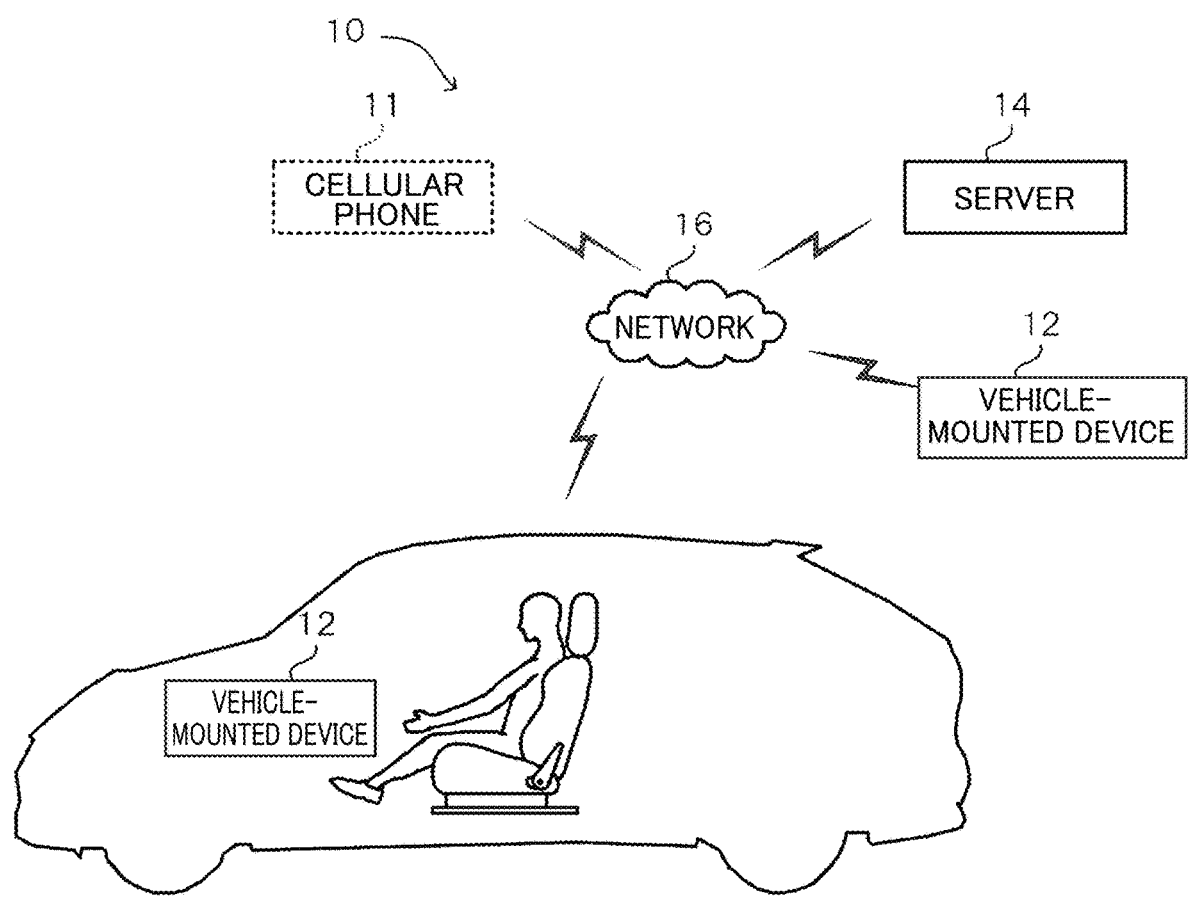
FIG. 1 is a drawing showing the schematic configuration of a navigation system according to an embodiment.
Figure 2:
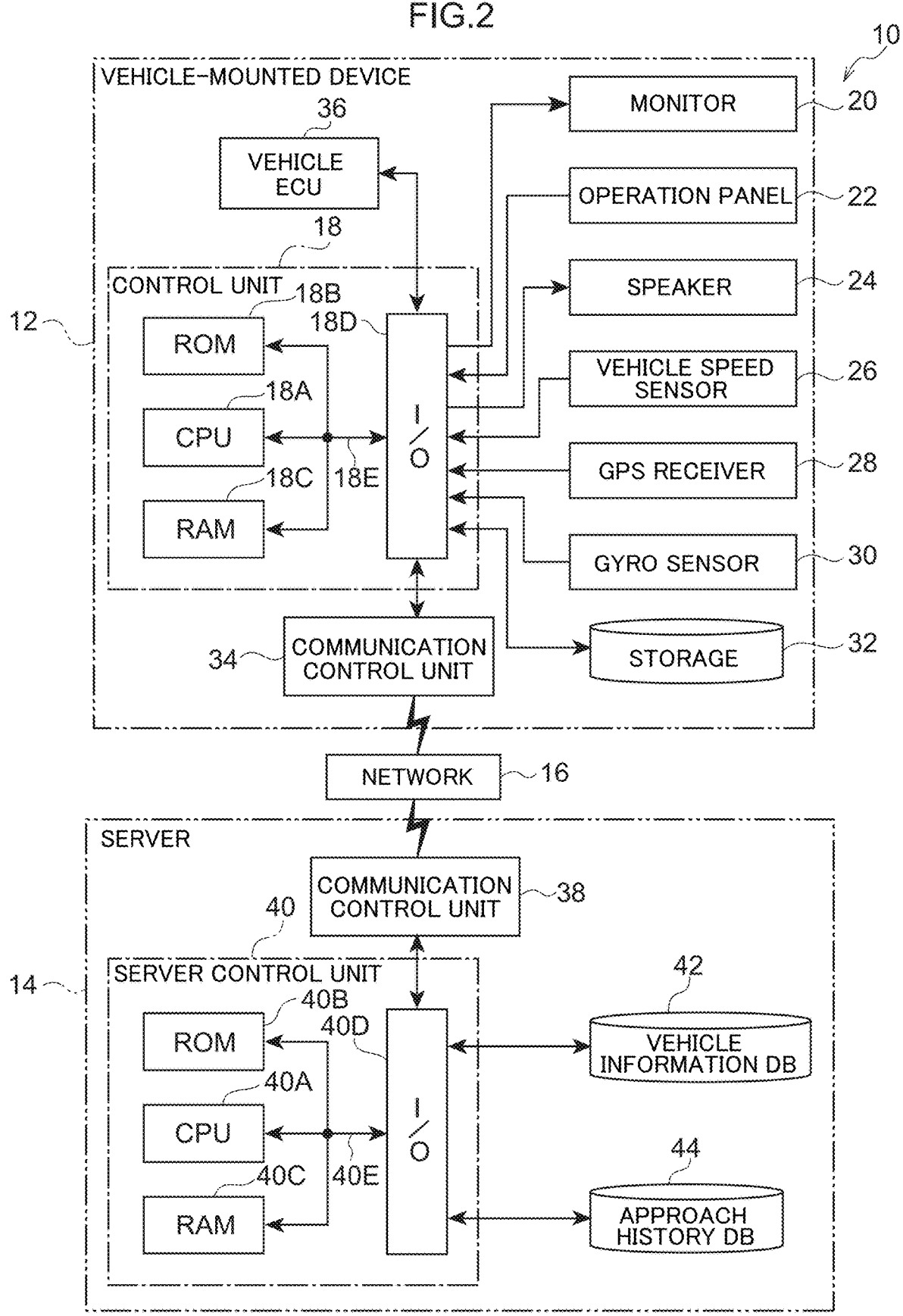
FIG. 2 is a block diagram showing an example of the specific configuration of the navigation system according to the embodiment.

An example of an embodiment of the present disclosure will be described below in detail with reference to the drawings. FIG. 1 is a drawing showing the schematic configuration of a navigation system according to the embodiment. FIG. 2 is a block diagram showing an example of the specific configuration of the navigation system according to the embodiment.

As shown in FIG. 1, a navigation system 10 according to the embodiment is a server network system in which vehicle-mounted devices 12 mounted on vehicles and a server 14 are connected through a network 16. FIG. 1 shows only the two vehicle-mounted devices 12, but three or more vehicle-mounted devices 12 may be connected to the network 16.

As shown in FIG. 2, the vehicle-mounted device 12 includes a control unit 18 that is configured by a computer in which a CPU 18A, a ROM 18B, a RAM 18C, and an I/O (input and output interface) 18D are connected to a bus 18E.

The ROM 18B stores a program that guides a user to a destination, a program that displays a map of vehicles of a specific car model, e.g. the same car model as a car model of an own vehicle, and the like. The programs stored in the ROM 18B are developed on the RAM 18C, and loaded into the CPU 18A. The CPU 18A executes the programs, so the control unit 18 exercises control to guide the user to the destination, and the like. The programs may be stored in a non-transitory recording medium, such as a CD-ROM or a DVD, and may be loaded into the ROM 18B.

A monitor 20, an operation panel 22, a speaker 24, a vehicle speed sensor 26, a GPS (global positioning system) receiver 28, a gyro sensor 30, a storage 32, a communication control unit 34, and a vehicle ECU 36 are connected to the I/O 18D. Each component may be configured to be connected to the I/O 18D through an in-vehicle network such as a CAN (controller area network). The control unit 18 and the GPS receiver 28 correspond to a detection unit. The control unit 18 and the communication control unit 34 correspond to a transmission unit and a reception unit. The control unit 18 and the monitor 20 correspond to a display unit.

The monitor 20 is provided in a center console or the like in the vehicle. The monitor 20 displays a map to guide the user to the set destination, and the like.

The operation panel 22 includes a touch panel, switches, and the like to input a destination setting and the like. The user can register his or her house location, set the destination, input a command for re-searching for a route, and the like on the operation panel 22. The user can also input a command for displaying a car model map, which indicates the positions of vehicles of a specific car model, and the like on the operation panel 22.

The speaker 24 generates sound that includes sound to guide the user to the set destination, audio, and the like.

The vehicle speed sensor 26 detects a driving speed of the vehicle (hereinafter referred to as a vehicle speed), and outputs a detection result to the control unit 18.

The GPS receiver 28 receives GPS signals, including time information, from GPS satellites, and outputs reception results to the control unit 18. The control unit 18 measures an own vehicle position from the plurality of GPS signals, and obtains own vehicle position information.

The gyro sensor 30 detects an acceleration, an angular acceleration, an angular speed, and the like, and outputs detection results to the control unit 18. The control unit 18 accordingly can detect the posture of the vehicle based on the detection results of the gyro sensor 30.

The storage 32 stores map information that is used for guiding the user to the set destination. The control unit 18 guides the user to the set destination based on the map information stored in the storage 32.

The communication control unit 34 communicates with the network 16 by wireless communications using a cellular phone network or the like, and thereby transmits and receives information to and from the server 14.

The vehicle ECU 36 performs various types of control, which includes engine control, air-conditioning control, and the like, in the vehicle. The vehicle ECU 36 stores, for example, information that include car model information of the vehicle on which the vehicle-mounted device 12 is mounted, and the like. In this embodiment, the control unit 18 can retrieve the car model information and the like from the vehicle ECU 36.

On the other hand, the server 14 includes a server control unit 40 that is configured by a computer in which a CPU 40A, a ROM 40B, a RAM 40C, and an I/O (input and output interface) 40D are connected to a bus 40E.

The ROM 40B of the server 14 stores a program that collects position information from the vehicle-mounted devices 12 registered in advance, a program that, in response to a request, transmits the position information of vehicles of a specific car model or map information (car model map) that indicates the positions of vehicles of the specific car model to the vehicle-mounted device 12, and the like. The programs stored in the ROM 40B are developed on the RAM 40C, and loaded into the CPU 40A. The CPU 40A executes the programs, so the server control unit 40 exercises control to offer the car model map, which indicates the positions of the vehicles of the predetermined specific car model, to the vehicle-mounted device 12, in response to the request from the vehicle-mounted device 12, and the like. The programs may be stored in a non-transitory recording medium, such as a CD-ROM or a DVD, and may be loaded into the ROM 40B.

To the I/O 40D, a vehicle information database (DB) 42, an approach history database (DB) 44, and a communication control unit 38 are connected. The server control unit 40 and the communication control unit 38 correspond to a collection unit and a sending back unit. The vehicle information DB 42 and the approach history DB 44 correspond to a storage unit.

The vehicle information DB 42 stores the car model information, in correspondence with identification information to identify the vehicle-mounted devices 12 registered in advance, and the position information of the vehicle-mounted devices 12.

The approach history DB 44 stores a date and time when a car model map request is issued, and information such as the identification information of the requestor vehicle-mounted device 12, as a request history. The position information may be obtained from the vehicle-mounted device 12 that has issued the car model map request, and a history of approach to another vehicle marked on the car model map offered by the server 14 may be stored in the approach history DB 44. This facilitates tracking, in case that a vehicle theft or the like occurs.

The communication control unit 38 communicates with the network 16 by wireless communications using a cellular phone network or the like, and thereby transmits and receives information to and from the vehicle-mounted devices 12 connected to the network 16.

Subsequently, how to generate and offer a car model map by the navigation system 10 according to the embodiment, which is configured as described above, will be described.

In the navigation system 10 according to the embodiment, specific information including a car model and the like is registered in advance on the server 14, in addition to the identification information on the vehicle-mounted device 12. The server 14 or the vehicle-mounted device 12 generates a car model map that indicates the positions of vehicles of the same car model as the user's car model, and the car model map is displayed on the monitor 20 of the user's vehicle-mounted device 12. This facilitates communication among users of the same car model, and, for example, allows encouraging interaction among owners of a special car model.

When the car model map is generated, the car model map includes only the vehicles that satisfy a predetermined security criterion, because the car model map could be abused in vehicle theft and the like. The vehicle that satisfies the predetermined security criterion includes, for example, a vehicle an ignition switch of which is turned on, a vehicle in which an elapsed time since the ignition switch has been turned off is a predetermined time or less, or the like.

Otherwise, as shown by a dotted line in FIG. 1, a user's cellular phone 11 may be connected to the network 16. The cellular phone 11 and the vehicle-mounted device 12 may be registered on the server 14 in a corresponding manner, and the server 14 may obtain position information of the cellular phone 11. When the position information of the user's cellular phone 11 and the position information of the registered vehicle-mounted device 12 coincide with each other or are present within a predetermined range, the vehicle may be determined as a vehicle that satisfies the predetermined security criterion. Alternatively, two or more of the above-described security criterions may be combined.

Next, an example of a specific process performed in each component of the navigation system 10 according to the embodiment, which is configured as described above, will be described.

Figure 3:
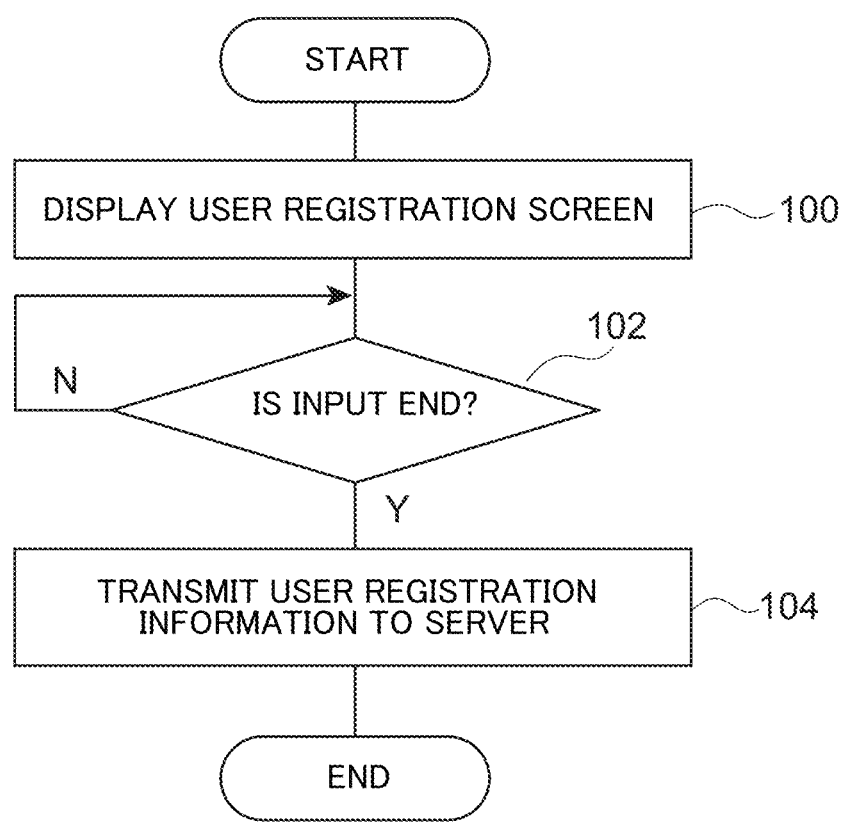
FIG. 3 is a flowchart showing an example of a process flow performed by a vehicle-mounted device at the time of registration for use of car model maps.

FIG. 3 is a flowchart showing an example of a process flow performed by the vehicle-mounted device 12, at the time of registration for use of car model maps. The process of FIG. 3 is started, for example, when the registration for use of car model maps has been commanded by operation of the operation panel 22.

In step 100, the CPU 18A displays a predetermined user registration screen on the monitor 20, and the process proceeds to step 102. As the user registration screen, for example, a screen to input user information, car model information, and the like is displayed. Note that, the car model information may be inputted by a user on the user registration screen, but may be retrieved from the vehicle ECU 36 by the CPU 18A.

In step 102, the CPU 18A determines whether or not input to the user registration screen has been completed. In the determination, for example, whether or not the user has inputted each item of the user registration screen by operating the operation panel 22, and has performed an operation to indicate the completion of input is determined. The CPU 18A waits until the determination becomes YES, and the process proceeds to step 104.

In step 104, the CPU 18A transmits the inputted user registration information to the server 14, so the process performed by the vehicle-mounted device 12 at the time of registration is completed.

Figure 4:
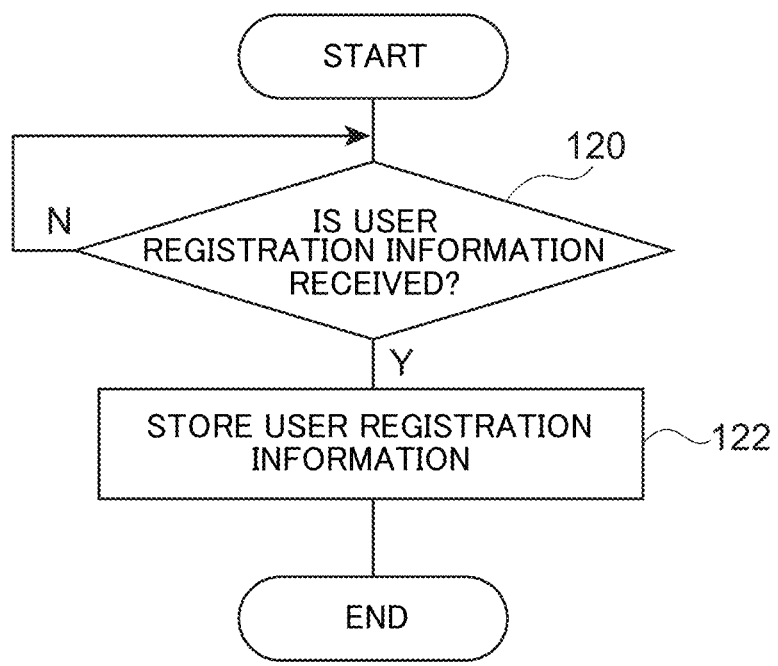
FIG. 4 is a flowchart showing an example of a process flow performed by a server at the time of registration for use of car model maps.

FIG. 4 is a flowchart showing an example of a process flow performed by the server 14, at the time of registration for use of car model maps. The process of FIG. 4 is started, when the user registration information has been transmitted from the vehicle-mounted device 12.

In step 120, the CPU 40A waits until reception of the user registration information, which is transmitted from the vehicle-mounted device 12, is completed, and the process proceeds to step 122.

In step 122, the CPU 40A stores the user registration information, which is received from the vehicle-mounted device 12, in the vehicle information DB 42 in correspondence with the identification information of the vehicle-mounted device 12, and thereby the process performed by the server 14 at the time of registration is completed.

Subsequently, a specific process performed by the navigation system 10, after the registration for use of car model maps, will be described.

Figure 5:
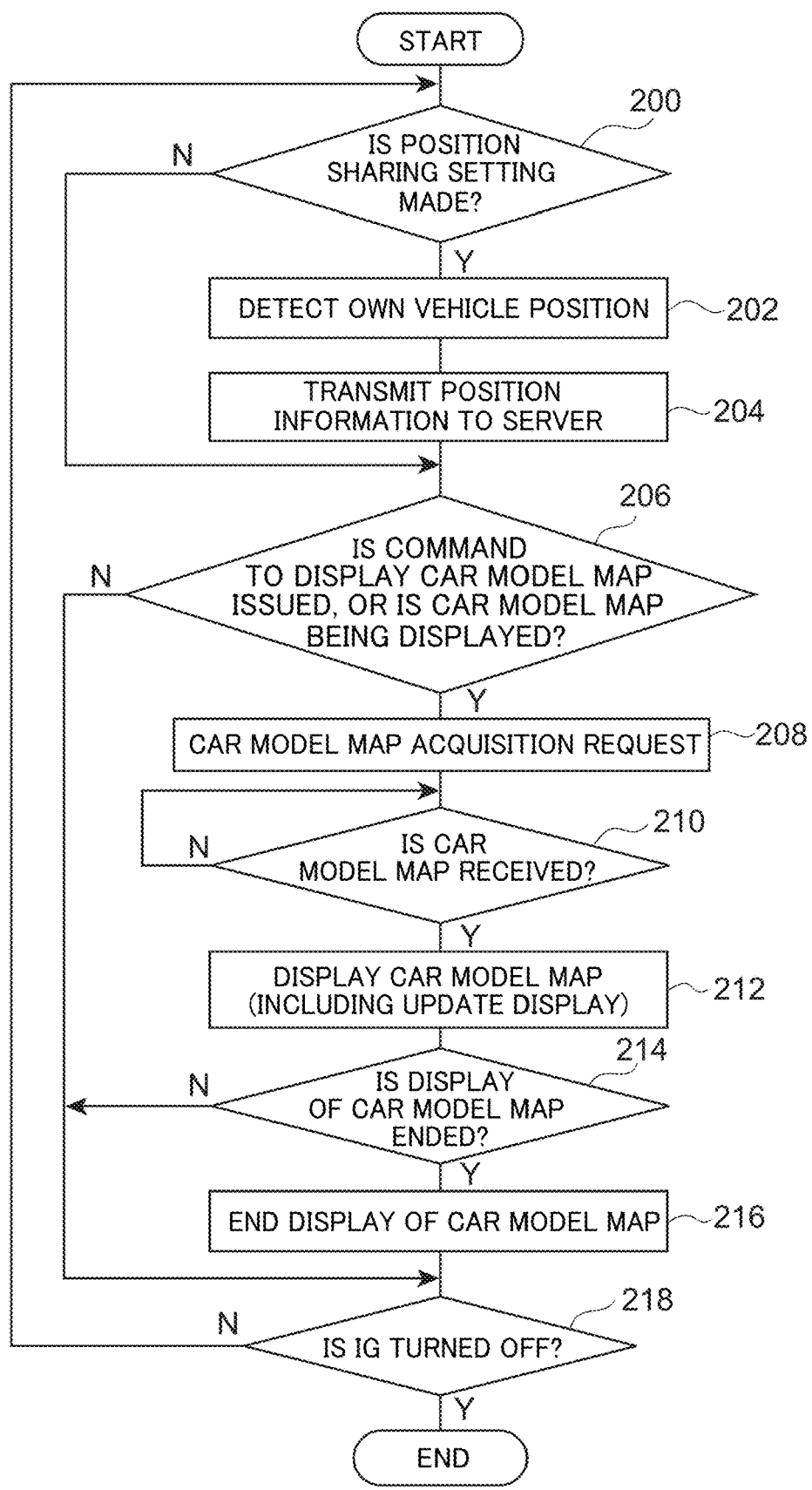
FIG. 5 is a flowchart showing an example of a specific process flow performed by the vehicle-mounted device after the registration for use of car model maps.

FIG. 5 is a flowchart showing an example of a specific process flow performed by the vehicle-mounted device 12, after the registration for use of car model maps. Note that, the process of FIG. 5 is started, for example, when an ignition switch has been turned on.

In step 200, the CPU 18A determines whether or not a position sharing setting is made. In the determination, for example, whether or not the sharing of the position information (display permission on a car model map) is set in advance, by the user's operation of the operation panel 22, is determined. If the determination is YES, the process proceeds to step 202. If the determination is NO, the process proceeds to step 206. In other words, if the user disables the sharing of the position information by his or her operation of the operation panel 22, his or her own vehicle is not displayed on a car model map, thus protecting his or her privacy. Note that, in the embodiment, the vehicle-mounted device 12 determines, in step 200, whether or not the position sharing setting is made, but the server 14 may determine whether or not the position sharing setting is made instead.

In step 202, the CPU 18A detects an own vehicle position from reception results of GPS signals received by the GPS receiver 28, and the process proceeds to step 204. In other words, the control unit 18 measures and detects the own vehicle position based on the reception results of the plurality of GPS signals. If no GPS signal can be received, the own vehicle position is estimated based on position information that is detected from previously received GPS signals and detection results of the vehicle speed sensor 26 and the gyro sensor 30. Note that, step 202 corresponds to a detection unit.

In step 204, the CPU 18A transmits the detected own vehicle position information to the server 14, and the process proceeds to step 206. When the own vehicle position information is transmitted to the server 14, the identification information of the vehicle-mounted device 12 is also transmitted to the server 14 in order to enable identification of the car model. Note that, step 204 corresponds to a transmission unit.

In step 206, the CPU 18A determines whether or not a command to display a car model map has been issued by operation of the operation panel 22, or whether or not the following steps have already been performed and a car model map is being displayed. If the determination is YES, the process proceeds to step 208. If the determination is NO, the process proceeds to step 218.

In step 208, the CPU 18A issues a car model map acquisition request to the server 14, and the process proceeds to step 210. When the car model map acquisition request is issued to the server 14, the current own vehicle position information and the identification information of the vehicle-mounted device 12 are also transmitted, so that the server 14 can recognize vehicles of the same car model near the user. Accordingly, the server 14 can identify the car model from the identification information of the vehicle-mounted device 12, and can search for vehicles of the same car model near the user.

In step 210, the CPU 18A waits for reception of a car model map that is transmitted from the server 14, and the process proceeds to step 212. The car model map to be received may be a map generated by the server 14, or may be only the position information of the nearby vehicles of the same car model. Note that, step 210 corresponds to a reception unit.

Figure 6:
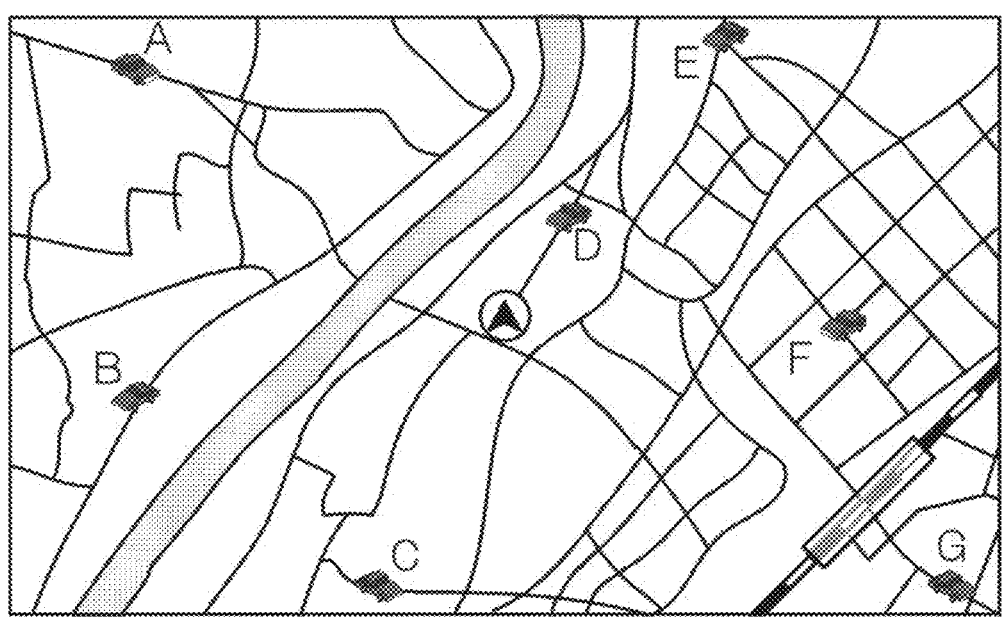
FIG. 6 is a drawing showing an example of a car model map.

In step 212, the CPU 18A displays the car model map received from the server 14 on the monitor 20, or if the preceding car model map has already been displayed on the monitor 20, the car model map is updated, and the process proceeds to step 214. For example, as shown in FIG. 6, a car model map in which vehicles A to G of the same car model are marked on a map is displayed on the monitor 20. Therefore, displaying the positions of the vehicles of the same car model near the user facilitates encouraging interaction with owners of the same car model. To display the car model map on the monitor 20, the car model map generated by the server 14 may be displayed, or alternatively, only the position information of the nearby vehicles of the same car model may be received from the server 14, and the vehicle-mounted device 12 may overlay the position information on a navigation map or the like on the monitor 20. Note that, step 212 corresponds to a display unit.

In step 214, the CPU 18A determines whether or not the display of the car model map is ended. In the determination, whether or not a command to end the display of the car model map is issued by operation of the operation panel 22 or the like is determined. If the determination is YES, the process proceeds to step 216. If the determination is NO, the process proceeds to step 218.

In step 216, the CPU 18A ends the display of the car model map on the monitor 20, and the process proceeds to step 218.

In step 218, the CPU 18A determines whether or not the ignition switch (IG) is turned off. If the determination is NO, the process returns to step 200, and the aforementioned steps are repeated. When the determination becomes YES, the series of steps performed by the vehicle-mounted device 12 are ended.

FIG. 7 is a flowchart showing an example of a specific process flow performed by the server 14, after the user registration for car model maps. The process of FIG. 7 is started, when a communication request has been issued to transmit the position information from the vehicle-mounted device 12, to issue the car model map request from the vehicle-mounted device 12, or the like.

In step 300, the CPU 40A determines whether or not the position information has been received from the vehicle-mounted device 12. In other words, it is determined that whether or not the position information that was transmitted from the vehicle-mounted device 12 in step 204, together with the identification information, has been received. If the determination is YES, the process proceeds to step 302. If the determination is NO, the process proceeds to step 304. Note that, since the position information of the plurality of vehicle-mounted devices 12 is collected in step 300, step 300 corresponds to a collection unit.

In step 302, the CPU 40A stores the position information received from the vehicle-mounted device 12 in the vehicle information DB 42, in correspondence with the identification information of the vehicle-mounted device 12, and the process proceeds to step 304. Note that, step 302 corresponds to a storage unit.

In step 304, the CPU 40A determines whether or not the vehicle-mounted device 12 has issued the car model map request. In other words, it is determined whether or not the aforementioned step 208 has been performed. If the determination is YES, the process proceeds to step 306. If the determination is NO, the process performed by the server 14 is ended.

In step 306, the CPU 40A searches for the vehicles of the same car model that are present within a predetermined range, relative to the requestor vehicle (vehicle-mounted device 12), based on the position information of the vehicle-mounted devices 12 stored in the vehicle information DB 42, and the process proceeds to step 308. Note that, step 306 corresponds to a part of a sending back unit.

In step 308, the CPU 40A extracts the vehicles that satisfy the predetermined security criterion, and the process proceeds to step 310. For example, as described above, a vehicle an ignition switch of which is turned on, a vehicle in which an elapsed time since the ignition switch has been turned off is a predetermined time or less, and the like are extracted. Alternatively, when the position information of the user's cellular phone 11 and the position information of the registered vehicle-mounted device 12 coincide with each other or are present within the predetermined range, the vehicle may be extracted as a vehicle that satisfies the predetermined security criterion. Alternatively, a vehicle that satisfies a combination of the above-described security criterions may be extracted.

In step 310, the CPU 40A transmits the car model map of the extracted vehicles to the requestor vehicle-mounted device 12, and the process proceeds to step 312. Note that, the car model map may be generated by the server 14 and transmitted to the vehicle-mounted device 12, or alternatively, only information about the positions of the extracted vehicles (vehicle-mounted devices 12) may be transmitted to the vehicle-mounted device 12, and the car model map may be generated by the vehicle-mounted device 12 and displayed on the monitor 20. Step 310 corresponds to a part of the sending back unit.

In step 312, the CPU 40A stores the request history in the approach history DB 44, and the process performed by the server 14 is ended. As the request history, a date and time when the car model map request is issued, and information such as the identification information of the requestor vehicle-mounted device 12 are stored. The position information of the vehicle that has issued the car model map request is obtained, and a history of approach to another vehicle marked on the car model map may be stored, together with an approach date and time. This facilitates tracking, in case that a vehicle theft or the like occurs.

According to the process, since the car model map on which that the vehicles of the same car model as the user's car model are marked can be displayed on the monitor 20, it is possible to encourage interaction among owners of the same car model.

The car model map could be abused in vehicle theft. However, only the vehicles that satisfy the predetermined security criterion are marked on the car model map, for the purpose of preventing abuse of the car model map.

In the above embodiment, the vehicle-mounted devices 12 transmit the position information to the server 14 and the server 14 collects the position information of the vehicles by push delivery, but not limited thereto, the server 14 may collect the position information from the vehicle-mounted devices 12 by pull delivery. FIG. 8 is a flowchart showing an example of a process flow performed by the server 14, when the server 14 collects the position information of the vehicles from the vehicle-mounted devices 12 by pull delivery. The process of FIG. 8 is started, when the vehicle-mounted device 12 has issued the car model map request. The same reference numerals as in FIG. 7 denote the same steps as in FIG. 7.

In step 301, the CPU 40A issues a position information request to the vehicles (vehicle-mounted devices 12) of the same car model as the car model of the vehicle having the requestor vehicle-mounted device 12, out of the vehicle-mounted devices 12 registered in advance, and the process proceeds to step 303. Accordingly, the vehicle-mounted devices 12 that have accepted the request transmit position information, in response to the request from the server 14. Note that, the vehicle-mounted devices 12 that are set to disable the sharing of the position information may transmit information indicating the impossibility of transmission of the position information.

In step 303, the CPU 40A waits for reception of the position information from the vehicle-mounted devices 12 registered in advance, and the process proceeds to step 305. In a case where all of the vehicle-mounted devices 12 can transmit the position information even in a state of turning off the ignition, the CPU 40A waits until receiving the position information or the information indicating the impossibility of transmission of the position information from all of the vehicle-mounted devices 12. In a case where the vehicle-mounted devices 12 cannot transmit the position information in a state of turning off the ignition, in step 303, for example, the CPU 40A waits for reception of the position information until a predetermined time elapses, and the process proceeds to step 305.

In step 305, the CPU 40A searches for the vehicles of the same car model, that are within the predetermined range relative to the requestor vehicle (vehicle-mounted device 12), based on the received position information, and the process proceeds to step 308.

In step 308, the CPU 40A extracts the vehicles that satisfy the predetermined security criterion, and the process proceeds to step 310. For example, as described above, a vehicle an ignition switch of which is turned on, a vehicle in which an elapsed time since the ignition switch has been turned off is a predetermined time or less, and the like are extracted. Alternatively, when the position information of the user's cellular phone 11 and the position information of the registered vehicle-mounted device 12 coincide with each other or are present within the predetermined range, the vehicle may be extracted as a vehicle that satisfies the predetermined security criterion. Alternatively, a vehicle that satisfies a combination of the above-described security criterions may be extracted.

In step 310, the CPU 40A transmits the car model map of the extracted vehicles to the requestor vehicle-mounted device 12, and the process proceeds to step 312. Note that, the car model map may be generated by the server 14 and transmitted to the vehicle-mounted device 12, or alternatively, only the position information of the extracted vehicles (vehicle-mounted devices 12) may be transmitted to the vehicle-mounted device 12, and the car model map may be generated by the vehicle-mounted device 12 and displayed on the monitor 20.

In step 312, the CPU 40A stores the request history in the approach history DB 44, and the process performed by the server 14 is ended. As the request history, a date and time when the car model map request is issued, and information such as the identification information of the requestor vehicle-mounted device 12 are stored. The position information of the requestor vehicle is obtained, and the history of approach to another vehicle marked on the car model map may be stored, together with an approach date and time. This facilitates tracking, in case that a vehicle theft or the like occurs.

As described above, when the car model map request is issued from the vehicle-mounted device 12, even if the server 14 collects the position information from the vehicle-mounted devices 12 registered in advance by pull delivery, it is possible to display the car model map on the monitor 20 of the vehicle-mounted device 12, just as in the case of push delivery.

In the above embodiment, the car model map of the same car model as the user's car model is displayed on the monitor 20, but the car model is not limited to the same car model. For example, a car model map of an unusual car model may be displayed on the monitor 20. Alternatively, a car model map of the user's specified car model may be displayed on the monitor 20.

In the above embodiment, the navigation system that displays the car model map generated by the vehicle-mounted device 12 or the server 14 on the monitor 20 of the vehicle-mounted device 12 is described, but the present disclosure is not limited to the navigation system. For example, an SNS (social network service) application or the like may have a similar function, and the car model information may be registered at the time of user registration. A car model map may be generated by an SNS server, and posted on an SNS. Alternatively, in the navigation system 10 according to the above embodiment, the car model map may be transmitted to the SNS server or the like on which the user registers, and thereafter the car model map may be shared on the SNS.

The above embodiment takes the server network system in which the vehicle-mounted devices 12 and the server 14 are connected to the network 16 as an example, but the present disclosure is not limited to this. For example, each vehicle-mounted device 12 may have the function of the server 14, and the vehicle-mounted device 12 may perform every step. For example, each vehicle-mounted device 12 may collect the position information and the car model information from the vehicle-mounted devices 12 of the other vehicles, may generate the car model map of the specific car model, and may display the generated car model map on the monitor 20.

In the above embodiment, the processes performed by the control unit 18 of the vehicle-mounted device 12 and the server control unit 40 of the server 14 may be software processes performed by running programs, or may be hardware processes. Alternatively, each process may be a combination of a software process and a hardware process. In the case of the software process, the program may be distributed in a state of being stored in various types of non-transitory recording mediums.

Furthermore, the present disclosure is not limited to the above description, but can be variously modified and performed within a range without departing from the scope of the present disclosure, in addition to above.

The present disclosure aims at providing a vehicle-mounted device, a server, a navigation system, a recording medium storing a map display program, and a map display method that can encourage interaction among owners of a specific car model, even if the owners are complete strangers.

A first aspect of the present disclosure is a vehicle-mounted device that includes: a memory; and a processor, wherein the processor is configured to: detect an own vehicle position; transmit position information that indicates the detected own vehicle position to a location outside the own vehicle, together with car model information that indicates a car model of the own vehicle; receive position information of another vehicle of a predetermined specific car model or map information that indicates a position of the other vehicle, from the location outside the own vehicle; and display the position of the other vehicle on a monitor as a map, based on a reception result.

According to the first aspect, a detection unit detects an own vehicle position. A transmission unit transmits position information that indicates the position of an own vehicle detected by the detection unit to the outside, together with car model information that indicates a car model of the own vehicle. Accordingly, the position and car model of the own vehicle can be transmitted to the outside. For example, the position information of the own vehicle can be transmitted to vehicle-mounted devices of external other vehicles, a server, or the like.

A reception unit receives position information of other vehicles of a predetermined specific car model or map information that indicates the positions of the other vehicles, from the outside. For example, the reception unit receives the position information that is transmitted from transmission units of the vehicle-mounted devices of the other vehicles, the map information that indicates the positions of the other vehicles collected by the server, or the like. A display unit displays the positions of the other vehicles of the specific car model as a map, based on a reception result of the reception unit. The provision of the vehicle-mounted devices serves to show the positions of the vehicles of the specific car model, and therefore allows to encourage interaction among owners of the specific car model, even if the owners are complete strangers.

The display unit may display the positions of only the vehicles that satisfy a predetermined security criterion, out of the positions of the other vehicles, on the map. The vehicle that satisfies the predetermined criterion may be a vehicle an ignition switch of which is turned on, or a vehicle in which an elapsed time since the ignition switch has been turned off is a predetermined time or less. The vehicle that satisfies the predetermined security criterion is a vehicle for which a display permission on the map is set in advance. The vehicle that satisfies the predetermined security criterion is a vehicle in which position information of a driver's cellular phone and the position information of the vehicle coincide with each other or are present within a predetermined range. Displaying only the vehicles that satisfy the predetermined security criterion on the map, as described above, allows an increase in crime prevention, in consideration of vehicle theft and the like.

The specific car model may be the same as the car model of the own vehicle. This facilitates encouraging interaction among owners of the same car model.

A second aspect of the present disclosure is a server that includes: a memory; and a processor, wherein the processor is configured to: collect, from a vehicle-mounted device registered in advance, position information that indicates a position of a vehicle that has the vehicle-mounted device, and car model information that indicates a car model of the vehicle; store the collected position information and car model information in a database; and in response to a request from the vehicle-mounted device, send the position information of a vehicle of a predetermined specific car model or map information that indicates a position of the vehicle of the specific car model, back to the vehicle-mounted device that made the request.

According to the second aspect, a collection unit collects, from vehicle-mounted devices registered in advance, position information that indicates the positions of vehicles having the vehicle-mounted devices and car model information that indicates car models of the vehicles. A storing unit stores the position information and the car model information collected by the collection unit.

In response to a request from the vehicle-mounted device, a sending back unit sends back the position information of the vehicles of a predetermined specific car model or map information that indicates the positions of the vehicles of the specific car model to the requestor vehicle-mounted device. Therefore, the requestor vehicle-mounted device can display the positions of the vehicles of the specific car model on a map. This serves to show the positions of the vehicles of the specific car model, and therefore allows to encourage interaction among owners of the specific car model, even if the owners are complete strangers.

The sending back unit may search for the vehicles that satisfy a predetermined security criterion, and may send back the position information or map information of the found vehicles, out of the position information stored in the storing unit, to the requestor vehicle-mounted device. Therefore, since only the vehicles that satisfy the predetermined security criterion are displayed on the requestor vehicle-mounted device, it is possible to improve crime prevention, in consideration of vehicle theft and the like.

After the sending back by the sending back unit, the collection unit may collect the position information of the vehicle having the requestor vehicle-mounted device, and the storing unit may further store the position information collected by the collection unit, as a history of approach to the vehicles of the specific car model. This facilitates tracking, based on the approach history stored in the storing unit, in case that a vehicle theft or the like occurs.

The present disclosure may be applied to a navigation system that includes the above-described vehicle-mounted device and the above-described server.

The present disclosure may be applied to a map display program that makes a computer function as each component of the above-described vehicle-mounted device.

The present disclosure may be applied to a map display program that makes a computer function as each component of the above-described server.

Furthermore, the present disclosure may be applied to a map display method in which a collection unit collects position information and car model information of vehicle-mounted devices registered in advance; in response to a request from the vehicle-mounted device, a sending back unit sends back the position information of the vehicles of a predetermined specific car model or map information that indicates the positions of the vehicles of the specific car model, based on the collected position information and car model information, to the requestor vehicle-mounted device; and the positions of the vehicles of the specific car model are displayed as a map, on a display unit of the requestor vehicle-mounted device.

As described above, according to the present disclosure, it is possible to provide the vehicle-mounted device, the server, the navigation system, the recording medium storing the map display program, and the map display method that can encourage interaction among owners of the specific car model, even if the owners are complete strangers.

What is claimed is:

1. A vehicle-mounted device, comprising:
a memory; and
a processor, wherein the processor is configured to:
display a predetermined user registration screen on a monitor where a user can input user registration information comprising user information and car model information;
determine whether the user registration screen has been completed;
upon determination that the user registration screen has been completed, transmit the user registration information to a server;
detect an own vehicle position;
transmit position information that indicates the detected own vehicle position to the server, together with car model information that indicates a car model of the own vehicle;
receive, from the server, position information of an other vehicle of a predetermined specific car model or map information that indicates a position of the other vehicle of the predetermined specific car model;
determine whether the other vehicle satisfies a predetermined security criterion; and
upon determination that the other vehicle satisfies the predetermined security criterion, display the position of the other vehicle on the monitor on a map;
wherein the other vehicle that satisfies the predetermined security criterion is an other vehicle for which an elapsed time since an ignition switch of the other vehicle has been turned on or off is a predetermined time or less, and a distance between a first position of a driver's cellular phone and a second position of the other vehicle is within a predetermined range.

2. The vehicle-mounted device according to claim 1, wherein the other vehicle that satisfies the predetermined security criterion is an other vehicle for which permission for display on the map is set in advance.

3. The vehicle-mounted device according to claim 1, wherein the predetermined specific car model is the same as the car model of the own vehicle.

4. A server, comprising:
a memory; and
a processor, wherein the processor is configured to:
receive, from a vehicle-mounted device, user registration information comprising user information and car model information associated with a user;
receive, from the vehicle-mounted device registered in advance, first position information that indicates a position of a vehicle that has the vehicle-mounted device, and car model information that indicates a car model of the vehicle;
store the first position information and car model information in a database;
in response to a request from the vehicle-mounted device:
search for a vehicle of a predetermined specific car model that satisfies a predetermined security criterion; and
transmit second position information of the vehicle of the predetermined specific car model that satisfies the predetermined security criterion or map information that indicates a position of the vehicle of the predetermined specific car model, back to the vehicle-mounted device that made the request;
wherein the vehicle that satisfies the predetermined security criterion is a vehicle for which an elapsed time since an ignition switch of the vehicle has been turned on or off is a predetermined time or less, and a distance between a first position of a driver's cellular phone and the second position of the vehicle that satisfies the predetermined security criterion is within a predetermined range.

5. The server according to claim 4, wherein:
the processor is further configured to receive the position information of the vehicle having the vehicle-mounted device that made the request, after transmitting back the requested information; and
the received position information is further stored in the database.

6. A navigation system, comprising:
a first vehicle-mounted device; and
a server, wherein:
the first vehicle-mounted device includes:
a memory; and
a processor, wherein the processor is configured to:
display a predetermined user registration screen on a monitor where a user can input user registration information comprising user information and car model information;
determine whether the user registration screen has been completed;
upon determination that the user registration screen has been completed, transmit the user registration information to the server;
detect an own vehicle position;
transmit first position information that indicates the detected own vehicle position to server, together with car model information that indicates a car model of the own vehicle;
receive, from the server, second position information of an other vehicle of a predetermined specific car model or map information that indicates a position of the other vehicle;
determine whether the other vehicle satisfies a predetermined security criterion; and
upon determination that the other vehicle satisfies the predetermined security criterion, display the second position of the other vehicle on the monitor on a map,
wherein the other vehicle that satisfies the predetermined security criterion is an other vehicle for which an elapsed time since an ignition switch of the other vehicle has been turned on or off is a predetermined time or less, and a distance between a first position of a driver's cellular phone and a second position of the other vehicle is within a predetermined range, and
the server includes:
a memory; and
a processor, wherein the processor is configured to:
receive, from the first vehicle-mounted device, the user registration information;
receive, from a second vehicle-mounted device registered in advance, the second position information that indicates a position of the other vehicle that has the second vehicle-mounted device, and car model information that indicates a car model of the other vehicle;
store the received second position information and car model information in a database; and
in response to a request from the first vehicle-mounted device, transmit the second position information of the other vehicle of the predetermined specific car model or map information that indicates a position of the other vehicle of the predetermined specific car model, back to the first vehicle-mounted device that made the request.

* * * * *